United States Patent [19]

Hangai et al.

[11] Patent Number: 5,130,968
[45] Date of Patent: Jul. 14, 1992

[54] APPARATUS FOR MONITORING A READING POSITION FOR USE IN A DISC PLAYER

[75] Inventors: Toshimasa Hangai; Koichi Ishitoya; Akihiko Tagawa, all of Tokorozawa, Japan

[73] Assignee: Pioneer Electronic Corporation, Tokyo, Japan

[21] Appl. No.: 649,333

[22] Filed: Feb. 1, 1991

Related U.S. Application Data

[63] Continuation of Ser. No. 417,157, Oct. 4, 1989, abandoned.

[30] Foreign Application Priority Data

Feb. 21, 1989 [JP] Japan .................. 1-41415

[51] Int. Cl.⁵ .................. G11B 7/00; H04N 5/76
[52] U.S. Cl. .................. 369/56; 369/32; 369/55; 369/219; 369/215
[58] Field of Search .................. 369/215, 219, 244, 32, 369/47, 56, 55, 217, 57, 33

[56] References Cited

U.S. PATENT DOCUMENTS

| | | | |
|---|---|---|---|
| 4,260,162 | 4/1981 | Morii et al. | 369/215 |
| 4,426,692 | 1/1984 | Hirata | 369/32 |
| 4,496,993 | 1/1985 | Sugiyama et al. | 369/32 |
| 4,519,056 | 5/1985 | Kimoto et al. | 360/56 |
| 4,562,577 | 12/1985 | Glover et al. | 369/22 |
| 4,723,235 | 2/1988 | Yasuda et al. | 369/32 |
| 4,800,549 | 1/1989 | Yamagami et al. | 369/56 |
| 4,855,979 | 8/1989 | Kimura et al. | 369/33 |
| 4,862,439 | 8/1989 | Ando et al. | 369/56 X |
| 4,879,705 | 11/1989 | Aoyagi et al. | 369/32 |
| 4,955,011 | 9/1990 | Baba | 369/56 |

Primary Examiner—Stuart S. Levy
Assistant Examiner—Joseph A. Rhoa
Attorney, Agent, or Firm—Sughrue, Mion, Zinn, Macpeak & Seas

[57] ABSTRACT

An apparatus for monitoring a reading position for use in a disc player includes a positional information generating device for generating positional information of an information reading point in a direction of disc radius in accordance with the movement of the information reading point. The apparatus is configured to perform operations of detecting a condition that the information reading point is in one of at least lead-in and lead-out areas on the disc, storing each positional information by the positional information generating device at the time of the detection, comparing the positional information by the positional information generating device during the movement of the information reading point, and monitoring the position of the information reading point with respect to the lead-in and lead-out areas on the basis of a result of the comparison.

5 Claims, 4 Drawing Sheets

APPARATUS FOR MONITORING A READING POSITION FOR USE IN A DISC PLAYER

This is a continuation of application Ser. No. 07/417,157 filed Oct. 4, 1989 now abandoned.

BACKGROUND OF THE INVENTION

1. Field of the Invention

The present invention relates to a disc player, and more specifically to an apparatus for monitoring a reading position for use in a disc player for playing an information recording disc on which an information signal is recorded together with an identification code for indicating a time axis position.

2. Description of Background Information

Information recording discs such as video discs and digital audio discs (simply referred to "discs" hereinafter) are configured that identification code such as a time code indicating a time axis position (position in a time axis) is recorded in addition to the information signal such as the video signal or an audio signal. Furthermore, in lead-in and lead-out areas respectively in the innermost and outermost track portions of the disc, there are recorded identification codes (lead-in code and lead-out code) for indicating that the present position is in each of these areas.

Disc players for playing this type of recording discs are structured such that an optical light beam is used to trace a recording track of a disc which is constituted by a series of pits formed in the recording surface of the disc, and a recording signal is read-out by detecting the light from the recording surface of the disc. For such operations, it is necessary to use various servo systems, namely, a focus servo system for converging the light beam onto the surface of the disc to form a light spot for reading information (information reading point), a tracking servo system for moving the information reading point so that it follows the recording track accurately, and a spindle servo system for controlling a relative speed of the information reading point with respect to the recording disc.

These servo systems are configured such that a control signal is produced by detecting the light from the information recording surface of the disc, and a control operation is performed by using the produced control signal. Therefore, if the information reading light spot traces a portion where no signal is recorded, erroneous control operations may be pursued so that the servo systems become uncontrollable. In the worst case, mechanisms of the disc player in each part can be destroyed.

Therefore, it is necessary to monitor the position of the information reading point in order that the information reading point will not be moved inwards beyond the lead-in area or outwards beyond the lead-out area. For this purpose, a method has been conventionally utilized in which the arrival of the information reading point at the lead-in area or lead-out area is detected by means of the contents of the identification code (lead-in code or lead-out code) read out from the disc.

However, in the case of this method, the lead-in and lead-out codes may not be read out because of reasons such that the focus servo system is placed in a defocusing condition, or the recorded information is not read-out accurately. In such an event, the information reading point can be driven inwards beyond the lead-in area or outwards beyond the lead-out area.

OBJECT AND SUMMARY OF THE INVENTION

The present invention is based on the recognition of the above-described point, and an object of the present invention is to provide an apparatus for monitoring the position of the information reading point by which the position of the information reading spot is surely monitored without regard to the status of servo systems, such as the defocusing condition of the focus servo system.

According to the present invention, a reading position monitoring apparatus for a disc player for playing a disc on which information signal is recorded together with an identification code indicating a time axis position is provided with a positional information generating device for generating positional information indicating the position of the information reading point in a radial direction as the information reading point moves. The apparatus is configured that a condition where the information reading point is at least in the lead-in area or the lead-out area on the disc is detected in accordance with the contents of the identification code read out from the disc, the positional information generated by the positional information generating means at the timing of the detection is stored, the stored positional information and the positional information generated by the positional information generating means are compared with each other during the movement of the information reading point, and a relative position of the information reading point with respect to the lead-in area and the lead-out area is monitored on the basis of a result of the comparison.

DETAILED DESCRIPTION OF A PREFERRED EMBODIMENT

Figure 1:
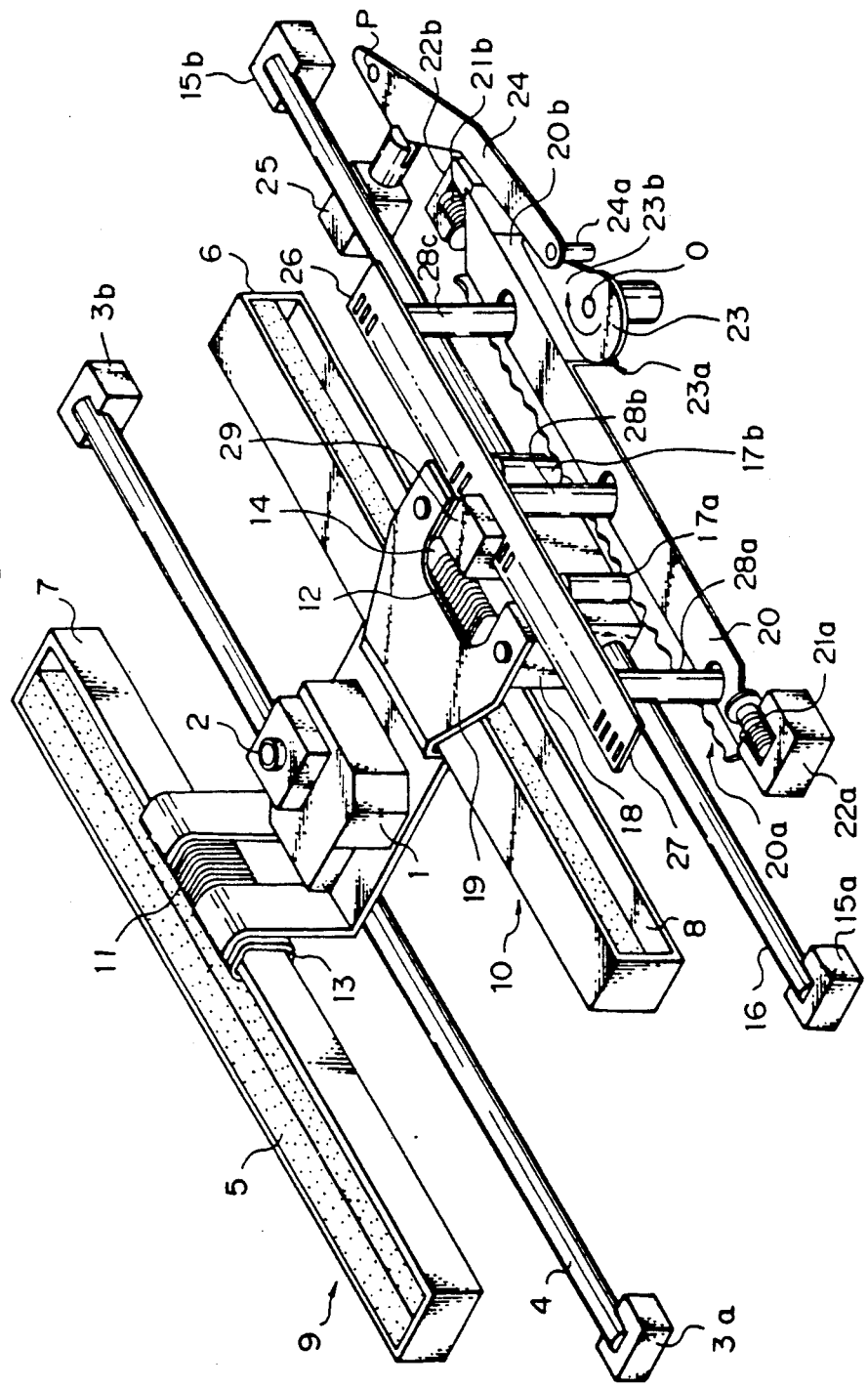
FIG. 1 is a structural diagram showing an example of slider driving mechanism in a disc playing system according to the present invention.

An embodiment of the present invention will be described with reference to the accompanying drawings. In FIG. 1, an optical pickup 2 for reading information recorded on a disc D (shown in FIG. 2) is mounted on a slider 1. The slider 1 is disposed to be movable along a straight guide shaft 4 which is supported by stop members 3a and 3b at both ends thereof. On both sides of the guide shaft 4 along the direction of movement of the slider, there are provided a pair of magnetic circuits 9 and 10 which are respectively made up of a magnet 5 or 6 arranged in parallel with the guide shaft 4 and a loop yoke 7 or 8 having rectangular form connected to the magnet 5 or 6 and forming a closed loop of magnetic field. The yokes 7 and 8 of the magnetic circuits 9 and 10 are operatively associated with a pair of coils 11 and 12 which are arranged to surround a part of respective yokes 7 and 8, and fixed to the slider 1 through a pair of coil holders 13 and 14. The slider 1 is directly driven by these magnetic circuits 9 and 10 and coils 11 and 12, so that an information reading light spot (information reading point) by the optical pickup 2 is moved in a direction of disc radius. In this way, these parts constitute a moving coil type linear motor LM.

On a position outside the magnetic circuit 10 with respect to the pickup 2, there is provided a straight guide shaft 16 in parallel with the guide shaft 4. The guide shaft 16 is supported by stop members 15a and 15b at both ends thereof, and a slide member 18 having a pair of protrusions 17a and 17b on its side wall is slidably fitted thereon. This slide member 18 is connected to the slider 1 through a connecting arm 19, and moves together with the slider 1. Furthermore, an elongated lock plate 20 having an L-shaped cross-section is provided along a guide shaft 16. The locking plate 20 has an irregular part 20a having a wave form and an engaging part 20b, and rotatably supported by a bearing members 22a and 22b at its rotating shaft 21a and 21b provided at both ends thereof. In the vicinity of the locking plate 20, a pressing cam 23 is rotatably disposed and urged in a direction indicated by the arrow by means of a biasing means (not illustrated). The pressing cam 23 engages with the engaging part 20b of the locking plate 20 on its cam surface 23a whose distance from a fulcrum of rotation O varies continuously as the rotation of the pressing cam 23. The engaging member 20b is pressed-in by the rotation of the pressing cam 23 in the direction indicated by the arrow. The pressing cam 23 further includes a nail part 23b on which a pin 24a mounted on an end of a rocking arm 24 is engaged. The rocking arm 24 is arranged to rock about a fulcrum of the rocking motion P at the other end thereof, and driven by a plunger 25 which is energized during the electric power is supplied to the player system. By the parts and members described above, a slider locking mechanism for selectively fixing the slider 1 is constituted.

Figure 2:
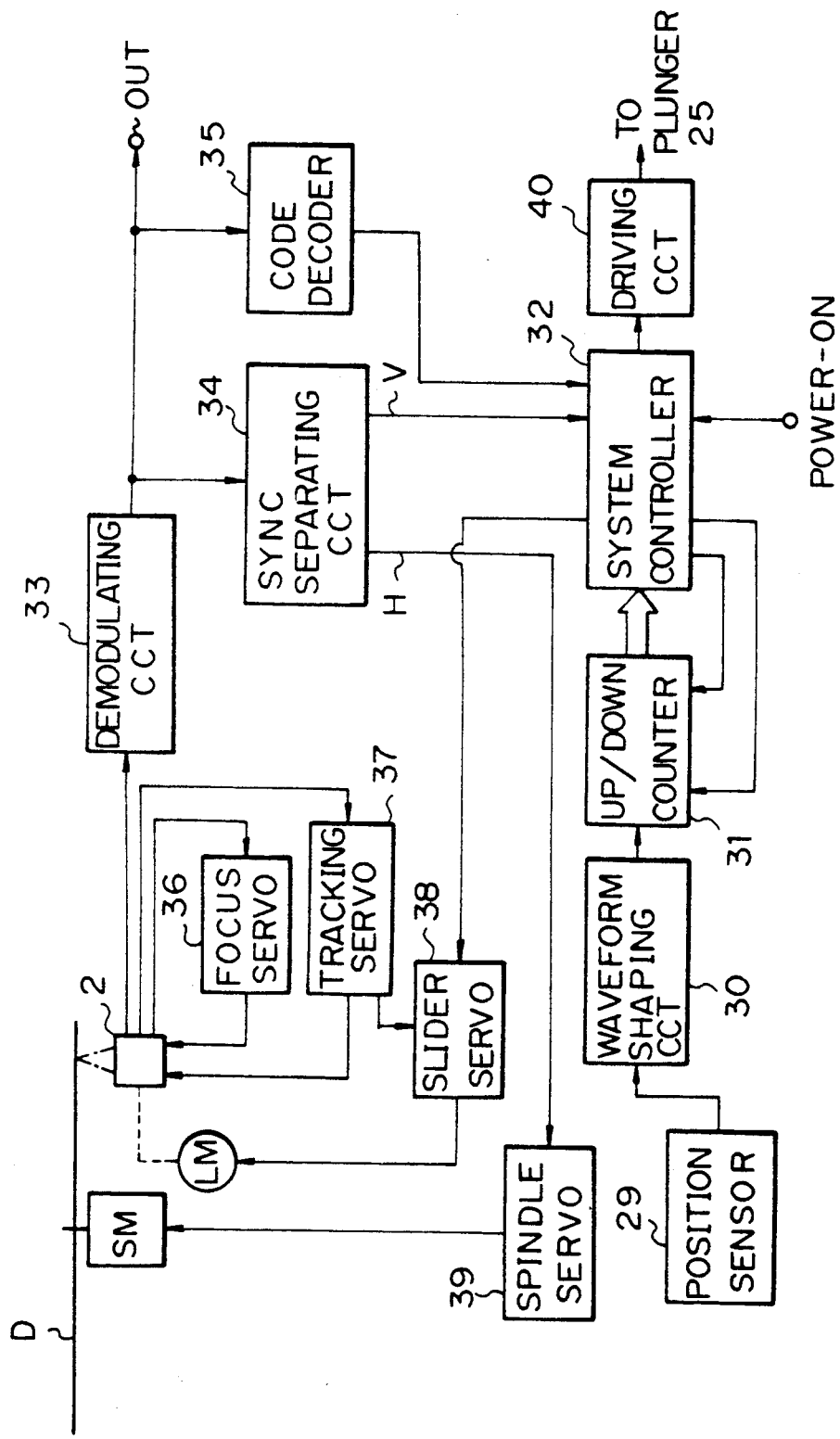
FIG. 2 is a block diagram showing an embodiment of the reading position monitoring apparatus according to the present invention.

Furthermore, a shutter plate 27 with a plurality of slits 26 which are apart from each other at a constant pitch is provided along the guide shaft 16, carried on three supporting posts 28a through 28c. A position sensor 29 including a light emitting element and a light receiving element which are arranged to sandwich the shutter plate 27 at the position of slits 26 is provided. The position sensor 29 is fixed on the sliding member 18 explained above, and is moved together with the slider 1. As shown in FIG. 2, an output signal of the position sensor 29 is shaped to a pulse wave signal at a waveform shaping circuit 30, and supplied to an up-down counter 31. A count value of the up-down counter 31 is supplied to a controller 32 as positional information of the information reading light spot in the direction of disc radius.

FIG. 2 is a block diagram showing an embodiment of the reading position monitoring apparatus according to the present invention.

In the FIG. 2, the disc D is rotated by a spindle motor SM, and information recorded on the disc D is read out by a pickup 2. The pickup 2 incorporates therein a laser diode, an objective lens, a focus actuator, a tracking actuator, and photo detectors, and so on. An RF signal output from the photo detectors in the pickup 2 as information reading signal is supplied to a demodulating circuit 33 consisting of an FM demodulator and so on. By this demodulating circuit 33, a video signal for example is demodulated and supplied to a sync separating circuit 34, a code decoder 35 and a video output terminal OUT.

The apparatus includes a focus servo circuit 36 configured to generate a focus error signal by an astigmatic method based on the output signals of the photo detectors in the pickup 2, and to supply the focus error signal to a focus actuator in the pickup 2 after suitably effecting to it a process of phase correction operation. On the other hand, a tracking servo circuit 37 is configured to generate a tracking error signal by a three-beam method based on the output signals of the photo detectors in the pickup 2, and to supply the tracking error signal to a tracking actuator in the pickup 2 after suitably effecting to it a process such as a phase compensation. A low frequency component of the tracking error signal is supplied to a slider servo circuit 38. The slider servo circuit 9 is configured to supply the low frequency component to the coils 11 and 12 (shown in FIG. 1) of the linear motor LM for driving the slider 1 (shown in FIG. 1), after suitably effecting a process such as a phase compensation.

A horizontal sync signal H separated from a reproduced video signal at a sync separating circuit 34 is supplied to a spindle servo circuit 39. The spindle servo circuit 39 is configured to generate a drive signal corresponding to a phase difference between the horizontal sync signal and a reference horizontal sync signal from a reference signal generating circuit (not shown), and to supply the drive signal to the spindle motor SP. By this spindle servo circuit 39, the rotational speed of the spindle motor SP is controlled so that a phase difference between the horizontal sync signal h and the reference horizontal sync signal becomes equal to zero. On the other hand, a vertical sync signal v separated from the reproduced video signal by means of the sync separating circuit 34 and code data extracted and decoded from the reproduced video signal by a code decoder are supplied to the system controller 32.

The system controller 32 is for example made up of a microcomputer and is configured to reset the up/down counter 31 when it is detected that the slider 1 has reached one of limit positions of the movement by sensing that the amount of change per unit time of the count value of the up/down counter 31 has dropped below a constant value, and to control the up/down counting operation of the up/down counter 31 in accordance with the direction of movement of the information reading point in each of the modes of the movement of the information reading point, such as the lead-in, lead-out, play, search, scan modes. The system controller 32 reads the count value of the up/down counter 31 as the positional information of the information reading point in the direction of disc radius, and monitors the reading position of the information reading point in each mode of movement on the basis of this positional information. The system controller 32 further maintains the plunger 25 of the slider locking mechanism in an energized state, by driving it through a driving circuit 40 during a power-on state. In a stop mode of the disc playing system, the system controller 32 monitors the count value of the up/down counter 31 and judges that the slider 1, which should not be moved, has been moved by an external disturbance such as a vibration from outside when the count value has changed more than a predetermined value, and put the plunger 25 in a non-energized state through the driving circuit 40, so as to fix the slider 1.

Referring to flowcharts of FIGS. 3 and 4, the operations of the monitoring of the reading position of the information reading point executed by the processor of the system controller 32 will be explained. For the monitoring process of the reading position of the information reading point, a table of correspondence between the lead-in and lead-out codes read from the lead-in and lead-out areas of the disc and the positional information obtained from the counter value of the up/down counter 31 is previously produced, and stored in an incorporated memory such as a RAM. This process is pursued in an initial processing after power up of the disc playing system.

Figure 3:
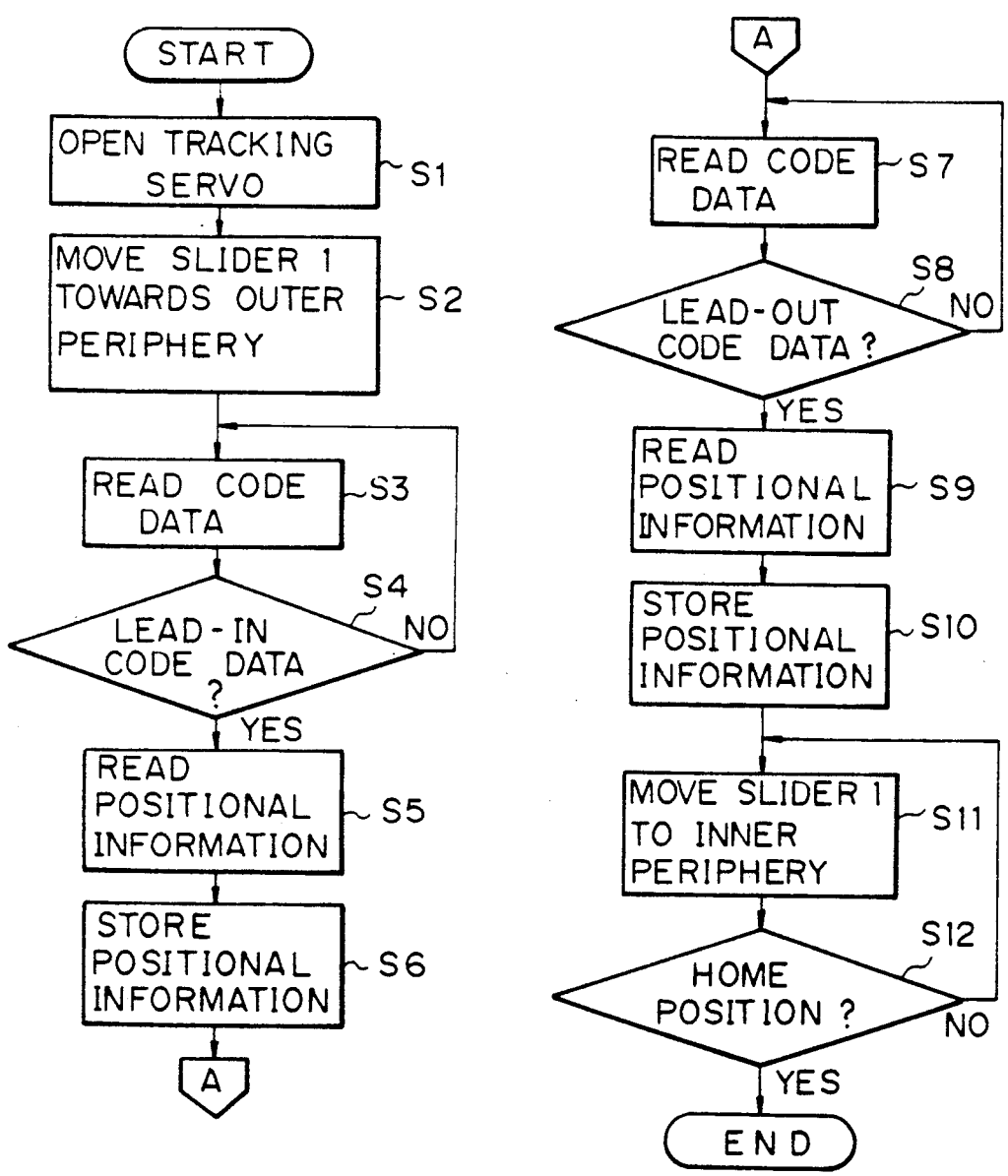
FIG. 3 is a flowchart showing steps of producing a table of correspondence between the lead-in and lead-out codes and positional information of the information reading point.

FIG. 3 shows the steps of producing this table of correspondence. In FIG. 3, the processor at first opens the tracking servo loop (step S1). Subsequently, the slider 1 is driven at a constant speed for example, to move the information reading point of the pickup 2 towards the outer periphery of the disc (step S2). During this movement of the information reading point toward the outer periphery of the disc, the processor reads code data decoded by the code decoder 35 (step S3), and judges as to whether or not the code data is the lead-in code data (step S4). If the code data is the lead-in code data, the processor reads the count value of the up/down counter 31 at that time (step S5), and stores the count value in a predetermined address of RAM as lead-in position information indicating an absolute position of the lead-in area of the disc to be played.

The processor continues the taking of code data (step S7), and judges as to whether or not the read code data is the lead-out code data (step S8). If the code data is the lead-out code, the processor reads the count value of the up/down counter 31 at that time (step S9), and stores the count value in a predetermined address of RAM as lead-out position information indicating the absolute position of the lead-out area of the disc being played (step S10). Subsequently, the processor drives the slider 1 at high speed, to move the pickup 2 towards the inner periphery of the disc's track area (step S11). When it is detected that the pickup 2 has reached a home position, a series of operations for generating the table of correspondence between the lead-in and lead-out codes and the absolute position information of the information reading point will be terminated.

On the basis of the correspondence table produced in this way, the reading position of the information reading point is monitored in each of the modes of movement of the information reading point by using the positional information obtained from the count value of the up/down counter 31. The steps for this operation will be explained with reference to FIG. 4 of the accompanying drawings. This subroutine is executed cyclically at a predetermined interval in each of the modes of the movement of the information reading point, such as the lead-in, lead-out, play, search, and scan modes.

The processor at first reads the count value of the up/down counter 31 as the positional information of the information reading point (step S21). Subsequently the processor judges the direction of movement of the information reading point (step S22). If the direction of movement of the information reading point is in the direction towards the outer periphery of the disc (FWD direction), the processor judges whether or not the read positional information is greater than the lead-out position information stored in the predetermined address of RAM, i.e. whether or not the information reading point has jumped over the lead-out area (step S23). If the information reading point has jumped over the lead-out area, the processor immediately stops driving of the slider 1 (step S24). If, on the other hand, the information reading point has not jumped over the lead-out area, the processor returns to the main flow without executing any further steps.

If it has been determined in step S22 that the direction of movement of the information reading point is towards the inner periphery of the disc's track area (REV direction) the processor judges as to whether or not the read positional information is smaller than the lead-in position information stored in the predetermined address of RAM, i.e. whether or not the information reading point has jumped over the lead-in area and entered into the mirror portion of the disc (step S25). If the information reading point has jumped over the lead-in area, the processor immediately proceeds to step S24, to stop the driving of the slider 1. If the information reading point has not jumped over the lead-in area, the processor returns to the main flow without executing an further steps.

As explained in the foregoing, the table of correspondence between the lead-in and lead-out codes and the absolute address information of the information reading point has been produced previously, and in each of the modes of movement of the information reading point the reading position of the information reading point is monitored on the basis of the absolute address of the information reading point obtained from the count value of the up/down counter. Therefore, the monitoring operation is not based on the information read-out from the disc, so that the reading position of the information reading point can be monitored accurately without regard to the status of the servo systems, for example even if the focus servo system is in the defocusing condition.

In the embodiment described above, the control operation is performed such that the slider 1 is stopped immediately when the information reading point has jumped over the lead-in area or the lead-out area. However it is also possible to adopt a control operation in which the slider 1 is moved back into the program area.

Furthermore, in the embodiment described above the processing steps for producing the table of correspondence are executed while the slider 1 is translated from the innermost track to the outermost track of the disc. However, it is also possible to execute the processing steps while the slider 1 is moved from the outermost track to the innermost track of the disc. Moreover, it is also possible to move the slider from an arbitrary position in the program area, and to turn over the direction of movement of the slider 1 when the lead-in area or lead-out are is detected. Still further, instead of opening the tracking servo loop during the translation of the slider, closing and opening of the tracking servo loop may be repeated at predetermined intervals during the translation of the slider 1.

Figure 4:
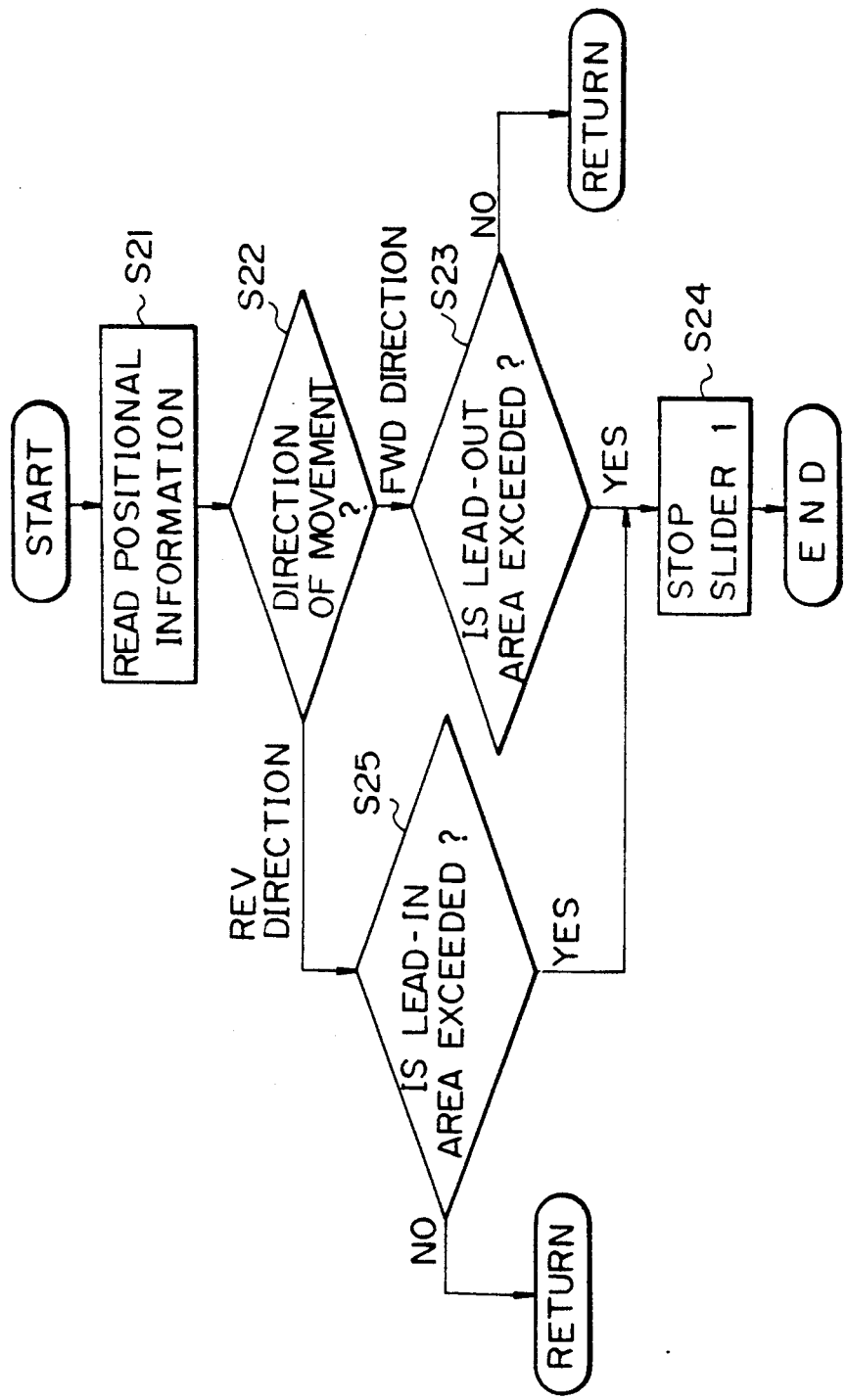
FIG. 4 is a flowchart showing steps of the operation for monitoring the reading position of the information reading point.

In the flowchart of FIG. 4, whether the information reading point is located inner than the lead-in area or outer than the lead-out area is detected in accordance with the direction of movement of the information reading point. However, since the essential point is to detect an area other than the program area, the operation in step S23 may be executed without regard to the direction of movement, to judge whether or not the information reading point is in a position outer than the lead-out area, and the operation in step S25 is executed if the answer is No for the judgement in step 23, to judge whether or not the information reading point is in a position inner than the lead-in area. In this case the same function is attained as in the case of the embodiment already described.

As specifically described in the foregoing, the apparatus for monitoring the reading position according to the present invention is structured to generate a positional information of the information reading point in a direction of disc radius as the movement of the information reading point occurs, and whether or not the information reading point is in either of the lead-in and lead-out areas at least is determined on the basis of the contents of the identification code read-out from the disc. Furthermore, each detected positional information at the time of the determination is stored, and the detected positional information is compared with the stored positional information during the movement of the information reading point. The position of the information reading point with respect to the lead-in area or the lead-out area is monitored by using a result of the comparison. Therefore, the monitoring operation is not based on the information read-out from the disc, and the reading position of the information reading point is surely monitored without regard to the status of the servo systems, such as the defocusing condition in the focus servo system.

What is claimed is:

1. An apparatus for monitoring a reading position of an information reading point in an optical disc player for playing an optical information recording disc on which an information signal is recorded with an identification code indicating the position on a time axis, said apparatus comprising:

positional information generating means for generating positional information indicating a position of said information reading point in a radial direction of said optical information recording disc in accordance with a movement of said information reading point;

reading means for reading said information signal and said identification code from said optical information recording disc;

decoding means for decoding said identification code read by said reading means and generating data indicating the position of said information reading point on the time axis on said optical information recording disc;

discrimination means for discriminating a condition that said information reading point is in one of a lead-in and a lead-out area on said optical information recording disc in accordance with said data generated by said decoding means;

storing means for storing respective positional information generated by said positional information generating means, said storing means storing generated positional information when it is detected, by said discrimination means, that said information reading point is in one of said lead-in and lead-out areas; and comparing means for comparing said positional information stored in said storing means and said positional information generated by said positional information generating means during movement of said information reading point so that the position of said information reading point with respect to said lead-in and lead-out areas is monitored according to a result of the comparison by said comparing means.

2. The apparatus as claimed in claim 1, wherein said positional information generating means comprises a means for generating a single pulse-form signal each time said information reading point travels a predetermined distance; and an up/down counter for counting up or counting down said pulse-form signal depending on the direction of movement of said information reading point, and outputting a count value as the positional information.

3. The apparatus as claimed in claim 1, wherein said positional information generating means includes means for detecting a distance said information reading point travels.

4. An apparatus for monitoring a reading position of an information reading point in an optical disc player for playing an optical information recording disc, the optical information recording disc having a lead-in area and a lead-out area, and having identification codes respectively recorded in the lead-in and lead-out areas, the apparatus comprising:

positional information generating means for generating positional information representing a position of the information reading point in a radial direction of the optical information recording disc in accordance with a movement of the information reading point;

reading means for reading said identification codes from said optical information recording disc;

decoding means for decoding said identification codes read by said reading means and generating data indicating the position of said information reading point on the time axis on said optical information recording disc;

discrimination means for identifying that the information reading point is located in one of the lead-in and lead-out areas in accordance with said data generated by said decoding means, storing means for storing respective generated positional information only when said discrimination means identifies that the information reading point is located in one of the lead-in and lead-out areas of the optical information recording disc so that only positional information corresponding to the lead-in and lead-out areas are stored in said storing means; and comparing means for comparing the information stored in said storing means with the positional information generated by said positional information generating means during movement of the information reading point so that the position of the information reading point with respect to the lead-in and lead-out areas is monitored according to a result of said comparing means.

5. The apparatus as claimed in claim 4, wherein said positional information generating means includes means for detecting a distance said information reading point travels.